US010715637B2

(12) United States Patent
Erdelyi (10) Patent No.: US 10,715,637 B2
(45) Date of Patent: Jul. 14, 2020

(54) SYSTEMS AND METHODS FOR AUTOMATED APPLICATION DEPLOYMENT MANAGEMENT

(71) Applicant: MasterCard International Incorporated, Purchase, NY (US)

(72) Inventor: Christopher John Erdelyi, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 659 days.

(21) Appl. No.: 15/466,462

(22) Filed: Mar. 22, 2017

(65) Prior Publication Data
US 2018/0278724 A1 Sep. 27, 2018

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/02* (2013.01); *H04L 67/06* (2013.01); *H04L 67/34* (2013.01)

(58) Field of Classification Search
CPC .......... H04L 67/42; H04L 67/34; H04L 67/06
USPC ................................................. 709/202–203
See application file for complete search history.

(56) References Cited

U.S. PATENT DOCUMENTS

| 7,228,326 B2 | 6/2007 | Srinivasan et al. |
| 7,895,591 B2 | 2/2011 | Spears |
| 8,516,477 B1 | 8/2013 | Kearns et al. |
| 8,522,231 B2 * | 8/2013 | Arcese ..................... H04L 67/34 709/219 |
| 9,536,081 B2 * | 1/2017 | Fiala ...................... H04L 67/141 |
| 9,692,498 B2 * | 6/2017 | Fan ........................ H04W 24/02 |
| 10,339,156 B2 * | 7/2019 | Hawa ...................... H04L 67/06 |
| 2005/0289536 A1 | 12/2005 | Nayak et al. |
| 2008/0120350 A1 * | 5/2008 | Grabowski ............. G06F 16/10 707/E17.01 |
| 2009/0119660 A1 * | 5/2009 | Redpath .................... G06F 8/61 717/175 |
| 2011/0093743 A1 * | 4/2011 | Arcese .................... H04L 67/34 709/206 |
| 2012/0117258 A1 | 5/2012 | Spivey |
| 2014/0229527 A1 * | 8/2014 | Bidarkar ................... G06F 9/54 709/203 |

* cited by examiner

*Primary Examiner* — Bharat Barot
(74) *Attorney, Agent, or Firm* — Armstrong Teasdale LLP (57) ABSTRACT

A method of automated deployment management for a computer network is provided. The method is implemented using a distributed deployment agent that includes a server system agent operating on a server system and a client system agent operating on a client system. The client system agent is communicatively coupled to the server system agent. The method includes determining target locations associated with the client system, generating (using a configuration file) a command file configured for execution on the client system that hosts a computer application, configuring the command file with deployment instructions for the client system to automate deployment of the command file, and causing the client system agent to extract the command file and execute the command file on the target locations. The execution activates a system update event on the client system and/or a software update event for the computer application.

20 Claims, 4 Drawing Sheets

SYSTEMS AND METHODS FOR AUTOMATED APPLICATION DEPLOYMENT MANAGEMENT

BACKGROUND

This disclosure relates to distributed application management using an automated deployment process. More specifically, the disclosure relates to that maintaining a computer network using configuration files to generate compressed deployment files.

Networked computing environments frequently employ a large number of computers. A large number of applications are oftentimes executing on each individual computer at any given time. Many computers in the environment will have a single operating system (or operating system kernel) controlling a plurality of virtualized computing instances. Such instances are sometimes known as containers. Each container may be associated with a specific user (or a specific user space) and containers may be effectively isolated from each other. One container will often run multiple applications, each with its own maintenance and upgrade cycle. Similarly, individual containers and their host computers will be subject to periodic maintenance and upgrades. A larger quantity of applications typically results in greater complexity, especially with respect to application maintenance.

Given the distributed nature of computing in such networked computing environments, application maintenance and upgrade can become a very tedious and time-consuming process. Especially in a containerized environment as described above, these tasks can become exceptionally labor-intensive. The task of installing an update to an application for a single computer host with multiple isolated containers, where each container runs identical instances of the same application, can be repetitive, laborious, and lead to errors. Such errors may be serious in the event that, for example, an application is erroneously updated with no backup or restore point for the application. Additionally, update files may become corrupted when they are transmitted from a deployment computer to a target computer.

Known processes suffer from several limitations in addressing the problems listed above. For example, some known systems involve purely manual and brute force methods. For a computer with multiple isolated containers running identical application instances, a maintenance engineer will often need to repeat the same upgrade process for each container until all application instances have been updated. Moreover, some known processes include no provision for tracking which container or folder has already received an update. A maintenance engineer may be required to manually maintain a separate running record of updated instances versus instances to be updated. It may simply be too time-consuming to manually create backups of each application (or application file(s)) that require updates. Similarly, updating an application within a container will often involve stopping that container, updating the application, and then starting the container. In some known systems, the stop and start procedures must be repeated manually each time. These procedures slow down the process further and, if inadvertently missed, result in errors and further rework.

BRIEF DESCRIPTION

In one aspect, a method of automated deployment management for a computer network is provided. The method is implemented using a distributed deployment agent that includes a server system agent operating on a server system and a client system agent operating on a client system, the client system agent being communicatively coupled to the server system agent. The method includes determining, by the server system agent, one or more target locations associated with the client system. The method also includes generating, by the server system agent, using a configuration file, a command file that includes computer-executable instructions configured to be executed on the client system, the client system hosting a computer application at the one or more target locations. The method further includes configuring, by the server system agent, the command file with deployment instructions for the client system to automate deployment of the command file. The method also includes transmitting, by the server system agent, a compressed file to the client system, where the compressed file includes the command file. The method further includes causing the client system agent to extract the command file from the compressed file. The method also includes causing the client system agent to execute the command file on the one or more target locations, where the execution activates one or more of a system update event on the client system and a software update event for the computer application.

In another aspect, a system for automated deployment management for a computer network is provided. The system includes a distributed deployment agent (DDA). The distributed deployment agent includes a server system agent operating on a server system and a client system agent operating on a client system, the client system agent being communicatively coupled to the server system agent. The DDA is configured to determine, by the server system agent, one or more target locations associated with the client system. The DDA is also configured to generate, by the server system agent, using a configuration file, a command file that includes computer-executable instructions configured to be executed on the client system, the client system hosting a computer application at the one or more target locations. The DDA is further configured to configure, by the server system agent, the command file with deployment instructions for the client system to automate deployment of the command file. The DDA is also configured to transmit, by the server system agent, a compressed file to the client system, where the compressed file includes the command file. The DDA is further configured to cause the client system agent to extract the command file from the compressed file. The DDA is also configured to cause the client system agent to execute the command file on the one or more target locations, where the execution activates one or more of a system update event on the client system and a software update event for the computer application.

In yet another aspect, a non-transitory computer readable medium that includes computer executable instructions for automated deployment management for a computer network is provided. When executed by a distributed deployment agent including a server system agent operating on a server system and a client system agent operating on a client system, the client system agent being communicatively coupled to the server system agent, the computer executable instructions cause the DDA to determine, by the server system agent, one or more target locations associated with the client system. The computer executable instructions also cause the DDA to generate, by the server system agent, using a configuration file, a command file that includes computer-executable instructions configured to be executed on the client system, the client system hosting a computer application at the one or more target locations. The computer executable instructions further cause the DDA to configure, by the server system agent, the command file with deployment instructions for the client system to automate deployment of the command file. The computer executable instructions also cause the DDA to transmit, by the server system agent, a compressed file to the client system, where the compressed file includes the command file. The computer executable instructions further cause the DDA to cause the client system agent to extract the command file from the compressed file. The computer executable instructions also cause the DDA to cause the client system agent to execute the command file on the one or more target locations, where the execution activates one or more of a system update event on the client system and a software update event for the computer application.

BRIEF DESCRIPTION OF THE DRAWINGS

FIGS. 1-4 show example embodiments of the methods and systems described herein.

Like numbers in the Figures indicate the same or functionally similar components.

DETAILED DESCRIPTION

This disclosure relates to automated application management in a containerized environment using configuration files. More specifically, the disclosure relates to an automated deployment process for maintaining a computer network using compressed deployment files.

In at least some implementations, the automated deployment process is managed using a distributed deployment agent (DDA) that includes at least two components, a server system agent and a client system agent. The DDA is configured to generate compressed command files that automatically update a client system or applications running on a client system. In one embodiment, the DDA generates a compressed file or "tarball" that includes the command files. As used herein, a tarball is a compressed archive of a file or files that are bundled together using the "tar" command and usually have the ".tar" file extension.

The DDA is configured to automatically discover target locations in the client system and determine each target for which an update is planned. More specifically, the server system agent uses a configuration file to generate the (compressed) command file that is transmitted to the client system. The configuration file stores instructions and data that is relevant to the command file and the application. For example, the configuration file may store the local folder address where the command file is located on the server system. The configuration file may also store specific instructions (e.g., deployment instructions) that are required to deploy the command file. These instructions may include command line switches, specific client system settings, or the like. The configuration file may also store client system information such as environment discovery data relating to the number and type of containers on a client system and associated application instances. The DDA uses the configuration files to automate a deployment process that would otherwise need to be performed manually. More specifically, the use of the configuration files in conjunction with the DDA obviates the need to manually and repetitively enter specific instructions for each command file deployment on each application instance.

At the client system, the client system agent extracts the command file and executes it on the client system. For example, the command file includes computer-executable instructions configured to update an application running on the client system or change a system state for the client system. Additionally, the server system agent configures the command file to automatically update itself for each determined target, obviating the need for repeated deployments or manual updates of the command file for each target.

In at least some implementations, a computer network will include a first computer (referred to herein as a server system) that is used to deploy command files to maintain or upgrade other computers. The computer network will also include a second computer (referred to herein as a client system) that receives the command files and applies them in various ways (e.g., to stop or start a computer component or to apply an update an application). A component of the DDA is installed on each of the server system and the client system. In the exemplary embodiment, these components are referred to as the server system agent and the client system agent, respectively. The server system and client system are communicatively coupled to each other via the computer network. More specifically, the server system agent and client system agent are communicatively coupled with each other such that they can exchange command files, log files, or the like. It should be noted that the server system and client system (and by extension, the server system agent and client system agent) may be interchangeable. In one embodiment of the disclosure, a computer A may transmit command files to a computer B, making computer A the server system and computer B the client system, or vice versa. Similarly, in one embodiment, the server system agent and client system agent are functionally indistinguishable. In another embodiment, they are specifically configured for their host computer systems. The server system agent and client system agent are, in yet another embodiment, interdependent components of a whole agent that is referred to herein as the DDA.

In at least some implementations, the client system is divided into component parts, known as containers (sometimes also called runtime environments). A container, as used herein, refers to a virtualized computer environment in which a number of applications (or software generally) operate in partial or complete isolation. In other words, an application executing in one container may have no visibility or access to applications executing in another container. In one embodiment, the client system is controlled by an operating system or, more specifically, a kernel program at the core of the operating system. The operating system instantiates (or allows the instantiation of) one or more containers. These containers make normal system calls to the operating system, function independently of each other using finite resources allocated by the operating system, and represent user-spaces accessed by different users, which may be mutually distrusting.

In the exemplary embodiment, a maintenance engineer determines that a client system is executing applications that require an update. For example, one instance of one application executing in a single container may require the update. As another example, several containers may be executing individual instances of the same application or of different applications, where each instance requires an update. Different versions of the same application may be executing on one or more containers. Accordingly, the maintenance engineer initiates an automatic environment discovery process. In one embodiment, the tarball includes folders with the names that are identical to those for folders on the client system agent. When the command file inside the tarball detects a match between folder names, the command file in the tarball is deployed to the client system. The folder path is given to command files in the tarball at the time of creation of the tarball on the server system. Each client system has a name, and that can be retrieved by the tool by interacting with the operating system. Files in the tarball can have further classification to only be written out to the client system if the server system name matches the first folder name of the file in the tarball.

Based on the environment discovery process, the server system agent determines one or more targets associated with one or more client systems. As used herein, the term target refers to a container, a folder, or the like. For example, an update may be required to an application executing on multiple containers on multiple client systems. Accordingly, the discovery process identifies these client systems. In one embodiment, the server system agent is configured to deploy to the correct application targets using only a client system identifier. For example, where the server system agent determines (or is provided) the client system that hosts the applications to be updated, the server system agent is configured to automatically determine the specific containers that the application(s) is/are executing on and deploy the command file to target only those containers. In one embodiment, there is hard coded mapping in the tool deployed on the client system to map host name to container identifiers. For example a host named prod1 has folders /sys/jboss/app01, /sys/jboss/app02, /sys/jboss/app03 and /sys/jboss/app04. By contrast, a host test1 has only folders /sys/jboss/app01 and /sys/jboss/app02. When the targeted client system is prod1, the files in the tarball will be deployed to four folders. When the target client system is test1 the files would only be deployed to two folders.

The server system agent is configured to generate a command file that will be transmitted to the client system. In one embodiment, the server system agent generates the command file using a configuration file that is stored at the server system. The configuration file is a file that stores specific configuration data associated with each client system. For example, the configuration file stores client system information including folder locations for command files to be transmitted, operating system data, hardware data, start/stop configuration settings, or the like. These details are formulated into specific configuration settings that drive the application of command files to the client system. Using these configuration settings, the server system agent can copy and install files of any type needed for a software installation.

In one embodiment, the configuration file includes configuration settings such as those in Example 1 below:
/apps_01/webapps/JBoss/conf/ABC_IR_server0/farm/ir.ear Example 1

If the configuration setting shown in Example 1 above is used by the server system agent, the server system agent will add the command file located at /apps_01/webapps/JBoss/conf/ABC_IR_server0/farm/ir.ear (on the server system) to a compressed file (or tarball) that is then transmitted to the client system.

More specifically, the server system agent is configured to dynamically update the configuration setting during use. For example, the configuration setting is set to "server0". The server system agent interprets this to mean that a container labeled server0 should receive the command file (i.e., the ir.ear file). However, the server system agent determines that the host that the command file is being transmitted to also includes other containers labeled server1, server2, and server3. Accordingly, the server system agent is configured to transmit the command file to each of the containers identified on the host during the environment discovery process. The server system agent is used to create the tarball using the command file. The command file determines which containers to update. Accordingly, that information is stored in the tarball. The client system agent then in turn reads the tarball and uses the information stored within to determine whether or not to update the container.

The server system agent transmits the command file as part of a compressed file to the client system. The compressed file is, in one embodiment, a combination of multiple archive files. In one embodiment, the compressed file is itself a tarball (i.e., a group of files compressed via the "tar" utility). In another embodiment, the tarball includes subsidiary compressed files. For example, the tarball may include enterprise application archives (or EAR files) that in turn further include web application archive (WAR) files and Java® application archive (JAR) files. (JAVA is a registered trademark of Oracle Corporation, headquartered in Redwood Shores, Calif., United States.)

The client system agent receives the compressed file and is configured to extract the command file from the compressed file. The client system agent is configured to execute the command file on the one or more previously determined target locations (or containers). Executing the command file causes one or more of a system update event on the client system and a software update event for the computer application. In one embodiment, installing an update to an application running on a container requires that the container first be stopped, the update applied, and then the container started up again. Accordingly, the client system agent receives the command file, stops the identified target container(s), installs the update included within the command file, and then restarts the container(s).

In one embodiment, the client system agent is also configured to perform command file validation in order to confirm that the transmitted command file has not been damaged or corrupted in transit. One example of this function is the use of a checksum algorithm to verify the command file contents. In this example, the server system agent, before transmitting the command file, generates a first checksum value (or hash value) for the file. In one embodiment, the first checksum value is an alphanumeric value generated using the contents of the command file. For example, the server system agent may use the MD5 and/or SHA-1 algorithms to generate the first checksum value. Once generated, the server system agent transmits the first checksum value along with the command file. When the client system agent receives the command file, the client system agent generates a second checksum value using the received file and compares it to the received first checksum value. If there is a match, the client system agent determines that the file was not corrupted in transit. If the checksum values do not match, the client system agent is configured to transmit an error message to the server system agent notifying the server system agent of the mismatch and requesting the command file to be re-sent.

In one embodiment, the client system agent is configured to automatically back up one or more files of the application that requires an update. More specifically, each time the client system agent recognizes that an application is to be updated, the client system agent is configured to copy each file of that application and store it in an archive location. Also, the client system agent is configured to preserve these archive or backup files such that they are not overwritten each time an update is made. In one embodiment, the client system agent generates a version control identifier and associates each archive file with the version control identifier. Each archive file indicates an application state for the application at the time of archive. This enables an update to be performed multiple times. More specifically, if one update attempt fails, the client system agent can simply retrieve the most recent archive of the application file using the latest version control identifier, install that archive version of the application on the container, and reattempt the update process. In one embodiment, the client system agent generates log files that log event data for each update process or each command file deployment. The client system agent transmits these files to the server system agent as well.

In one embodiment, the server system agent determines (e.g., via received log files) that a container did not start up or shut down in an expected manner. This may be during an application update or may simply be a failure state encountered during routine processing. Accordingly, the server system agent is configured to generate command files to start or stop the affected container. Additionally, a graceful shutdown may fail, requiring a force shutdown. As used herein, a graceful shutdown refers to a state where a container or runtime environment waits to transmit or receive data before terminating processing. A force shutdown refers to a state where the container is forced to stop processing even though some data is queued or still in transit and will be lost at shutdown. Accordingly, the server system agent is configured to determine that a graceful shutdown failed such that a force shutdown maybe required. In one embodiment, the server system uses the configuration setting shown in Example 2 below.

/apps_01/webapps/JBoss/conf/ABC_IR_server0/farm/bounce-trigger.txt, /tmp/garbage.txt Example 2

As shown in Example 2 above, the server system agent will use a command file labeled bounce-trigger.txt and "bounce" (or stop then start) a container to refresh its state. In one embodiment, the configuration setting above requires the presence of the file /tmp/garbage.txt at the server system to perform the above bounce process.

The technical problems addressed by this system include at least one of: (i) inability to automatically deploy application updates to multiple applications executing in multiple containers, (ii) inability of known systems to automatically locate containers that require updates knowing only a client system identifier, (iii) application errors introduced due to repetitive manual processing of application updates, and (iv) problems caused by corrupted application update files being transmitted and installed without validation checking.

The methods and systems described herein may be implemented using computer programming or engineering techniques including computer software, firmware, hardware, or any combination or subset thereof, wherein the technical effects may be achieved at least by a) determining, by the server system agent, one or more target locations associated with the client system, b) generating, by the server system agent, using a configuration file, a command file that includes computer-executable instructions configured to be executed on the client system, the client system hosting a computer application at the one or more target locations, c) configuring, by the server system agent, the command file with deployment instructions for the client system to automate deployment of the command file, d) transmitting, by the server system agent, a compressed file to the client system, wherein the compressed file includes the command file, e) causing the client system agent to extract the command file from the compressed file, and f) causing the client system agent to execute the command file on the one or more target locations, wherein the execution activates one or more of a system update event on the client system and a software update event for the computer application.

The resulting technical benefits achieved by this system include at least one of: (i) automatic deployment of application updates to all application instances that require them, (ii) automatic backup of targeted application files, (iii) security against accidental overwrites of backup files and current application files, enabling multiple attempts to update the same application, and (iv) ability to restore an application to any prior version by configuration number, (v) improved validation of application update files using checksum algorithms, (vi) ability to deploy to all targeted application instances without the need to customize deployment commands for each application instance, (vii) ability to shut down servers gracefully, discover failed shut downs, and then force shutdowns in the event that a graceful shutdown fails, and (viii) ability to install files of any type needed for a software installation.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
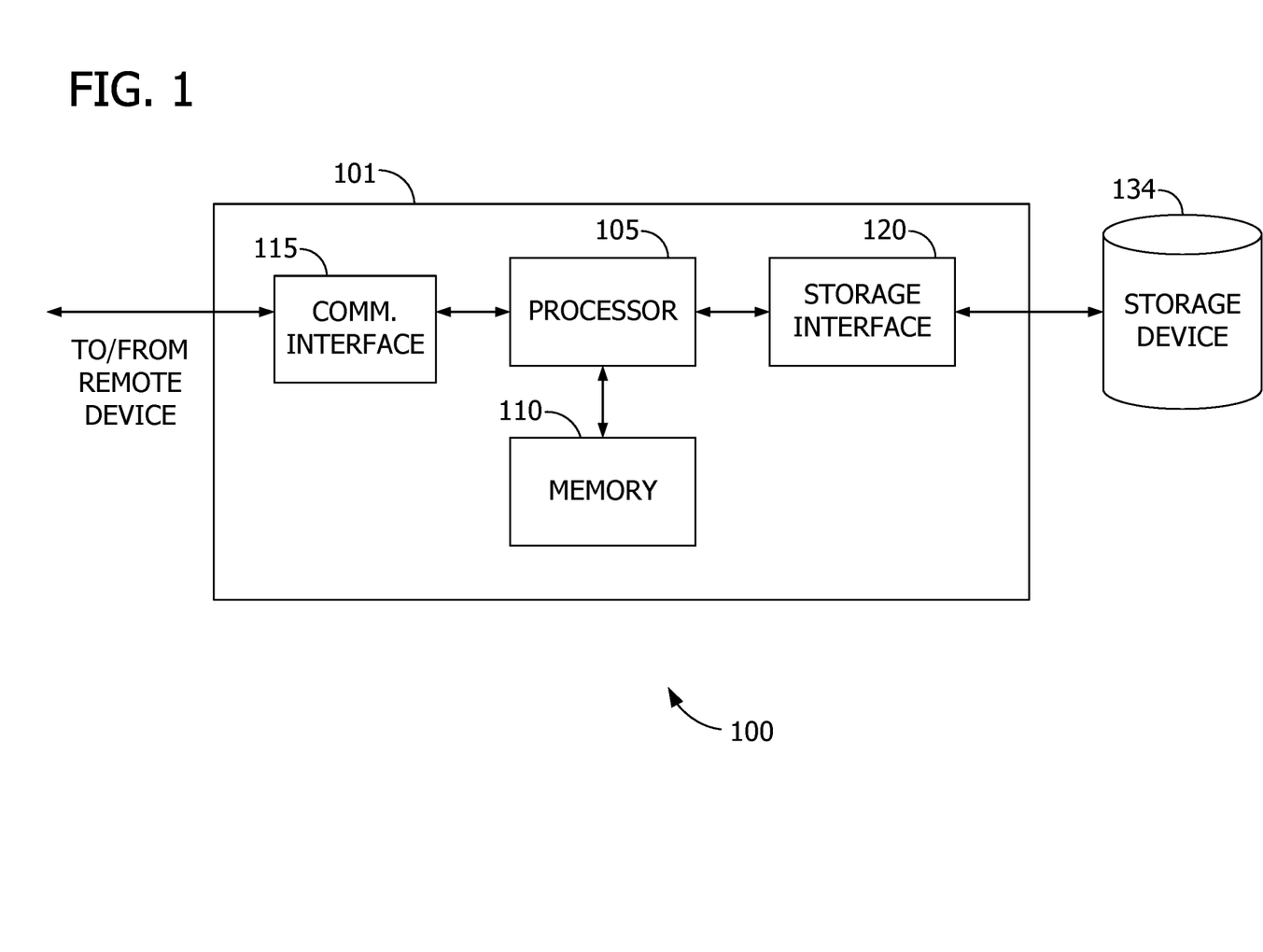
FIG. 1 shows an example configuration of a computer system 100 that can serve as a server system agent or a client system agent in order to facilitate application deployment management in accordance with one embodiment of the present disclosure.

FIG. 1 shows an example configuration of a computer system 100 that can serve as a server system agent or a client system agent in order to facilitate application deployment management in accordance with one embodiment of the present disclosure. Server system 100 includes a processor 105 for executing instructions. Instructions may be stored in a memory area 110, for example. Processor 105 may include one or more processing units (e.g., in a multi-core configuration) for executing instructions. The instructions may be executed within a variety of different operating systems on the server system 100, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.). Processor 105 is operatively coupled to a communication interface 115 such that server system 100 is capable of communicating with a remote device such as a computer device or another server system 100.

Processor 105 may also be operatively coupled to a storage device 134. Storage device 134 is any computer-operated hardware suitable for storing and/or retrieving data. In some embodiments, storage device 134 is integrated in server system 100. In other embodiments, storage device 134 is external to server system 100 and is similar to database 120 (shown in FIG. 2). For example, server system 100 may include one or more hard disk drives as storage device 134. In other embodiments, storage device 134 is external to server system 100 and may be accessed by a plurality of server systems 100. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
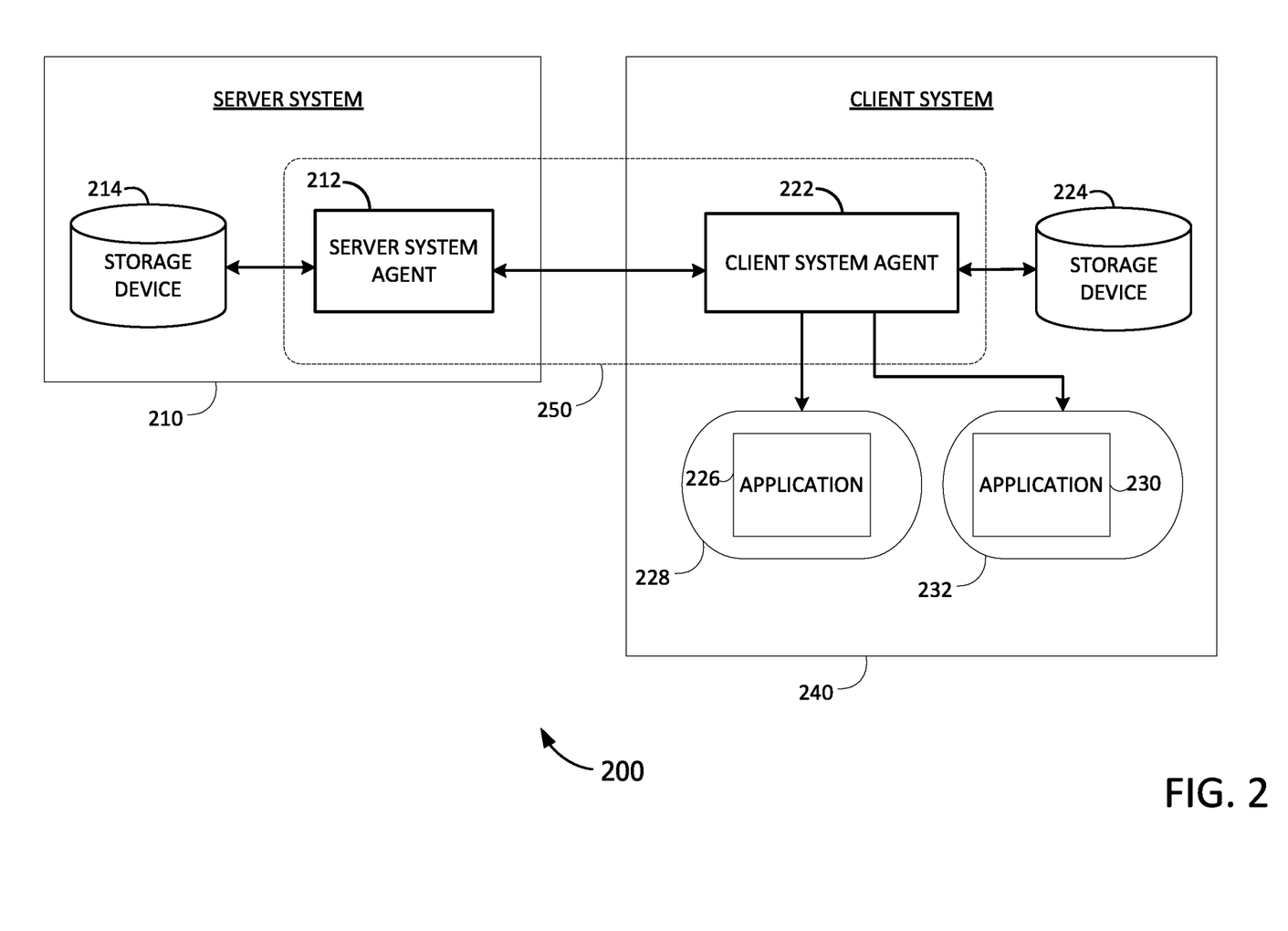
FIG. 2 shows an example configuration showing how a distributed deployment agent (DDA) manages automated application deployment in accordance with one embodiment of the present disclosure.

FIG. 2 shows an example configuration 200 showing how a distributed deployment agent manages automated application deployment in accordance with one embodiment of the present disclosure. As shown, configuration 200 includes a server system 210 and a client system 240. Both server system 210 and client system 240 are computer systems similar to computer device 100 described with respect to FIG. 1. As described earlier, server system 210 and client system 240 may be interchangeable or comparable in that they are computer systems that are part of a computer network where each may execute one or more applications. Server system 210 and client system 240 are designated as such to indicate that application update files will be served by server system 210 and received by client system 240 as shown in FIG. 2.

Server system 210 includes a server system agent 212 and storage device 214. In one embodiment, server system agent 212 is a computer application executing using a computer processor, similar to processor 105 as described with respect to FIG. 1. Other components may be included, similar to those shown in FIG. 1. Additionally, in one embodiment, server system 210 executes one or more other applications (not shown) in addition to server system agent 212. Client system 240 includes client system agent 222, storage device 224, application 226, and application 230. Similar to server system agent 212, client system agent 222 also is a computer application executing using a computer processor, similar to processor 105 as described with respect to FIG. 1. Applications 226 and 230 operate within isolated virtualized environments known as containers. In one embodiment, Applications 226 and 230 execute within containers 228 and 232 respectively. Server system 212 and client system 222 are collectively termed distributed deployment agent (DDA) 250 as described earlier.

Server system agent 212 and client system agent 222 are communicatively coupled to each other. In one embodiment, server system 212 generates a command file and includes the command file within a compressed file (or tarball). In one embodiment, storage device 214 stores multiple files necessary to perform application update deployment. For example, storage device 214 stores configuration files, command files, and the like. In one embodiment, server system agent 212 uses a configuration file to prepare a command file for deployment to client system 240. In one embodiment, server system agent 212 includes the command file in a compressed file (e.g., a tarball) before transmission to client system agent 222.

Client system agent 222 receives the command file (in compressed form), extracts the command file, and applies the update to one or more application instances. In one embodiment, client system agent 222 extracts the command file and determines that application 226 requires the update. Client system agent 222 determines this using instructions stored within the command file. Client system agent 222 applies the update embodied by the command file to application 226.

Figure 3:
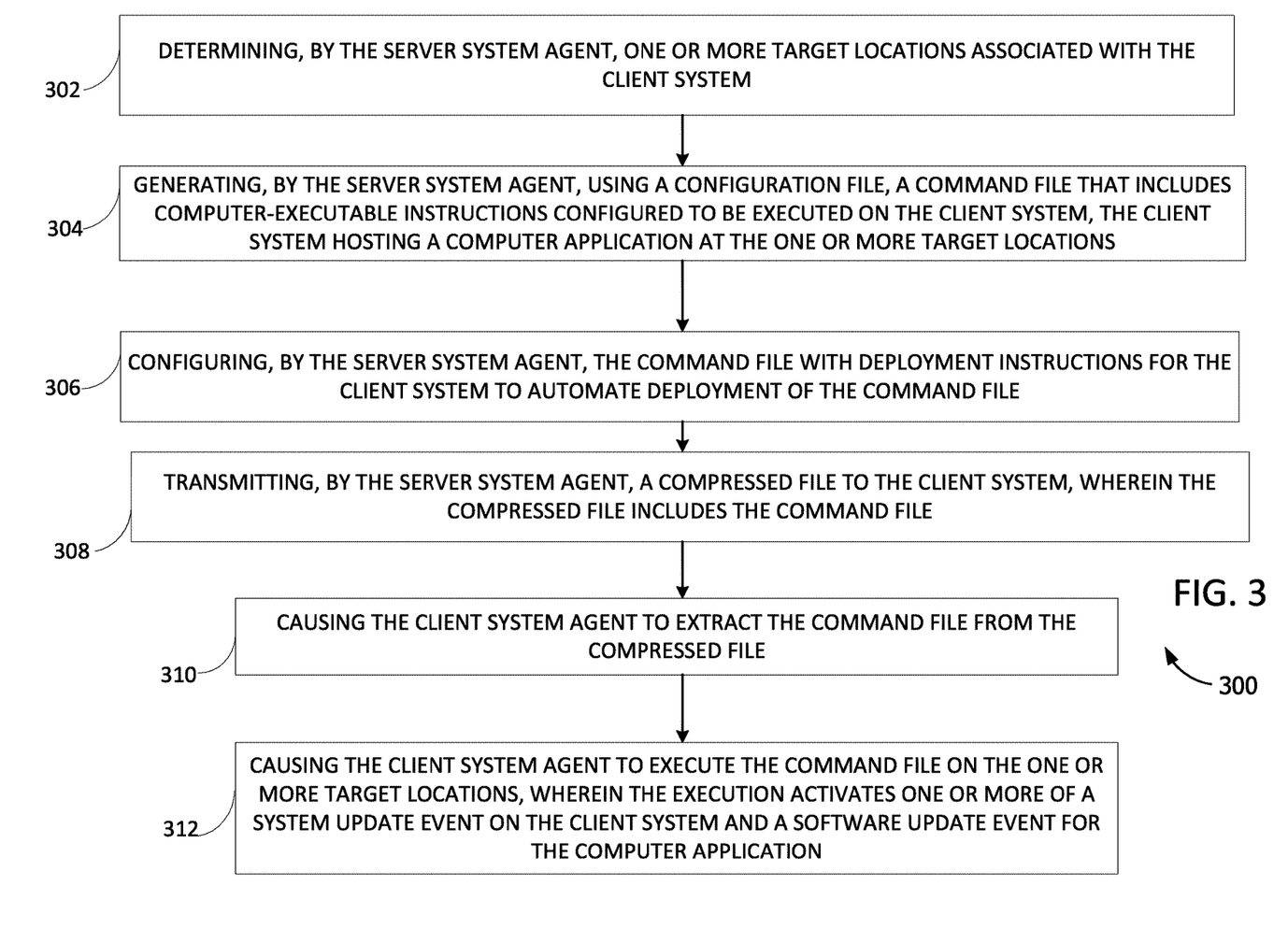
FIG. 3 shows an example method flow illustrating how the distributed deployment agent (DDA) manages automated application deployment for a computer network in accordance with one embodiment of the present disclosure.

FIG. 3 shows an example method flow illustrating how the distributed deployment agent (DDA) (i.e., the server system agent and client system agent, collectively) manages application deployment for a computer network. As shown, the DDA is configured to determine 302, by the server system agent, one or more target locations associated with the client system. As described above, the server system agent performs an automatic environment discovery process. This environment discovery process includes identifying each connected computer device. More specifically, this includes discovering each client system that has the capability to receive command files from the server system running the server system agent. The environment discovery process includes determining client system identifiers, determining container instances operating on each client system, determining each application instance executing on the client system, and the like. In one embodiment, the server system agent generates a system map using the environment discovery process. The server system agent associates each application instance with its container and client system. As an example, the server system agent generates a series of database tables that associate each application instance, container, and client system. As another example, the server system agent stores the abovementioned data in a graph database, with application instances, containers, and client systems represented by nodes and edges created between those nodes to show relationships.

As a result of the environment discovery process, the server system agent is aware of each application instance. Accordingly, when an application update must be deployed, the server system agent queries the database generated from the environment discovery process to identify application instances that require the update. In one embodiment, the server system agent further identifies specific containers or client systems that need to be targeted for the update. In one embodiment, the server system agent determines the application type that requires the update and initially just retrieves a list of client system identifiers to target for the update. In other words, the server system agent does not identify each individual application instance or container. This is because the client system agent is configured, as described later, to apply the update to the relevant application instance just by knowing the client system identifier and without the need for each application instance to first be identified.

The DDA is configured to generate 304, by the server system agent, using a configuration file, a command file that includes computer-executable instructions configured to be executed on the client system. In one embodiment, the command file represents an application upgrade, patch, or rollback that results in a change to the application code or operation. In another embodiment, the command file is a system-level instructions (e.g., system start, system stop, poll system for state, check connectivity speed at system, force shutdown, force restart, or the like). In yet another embodiment, the command file is a combination of one or more application updates and system-level instructions. Moreover, the command file is included within a compressed file (or tarball) before transmission.

The DDA is configured to configure 306, by the server system agent, the command file with deployment instructions for the client system to automate deployment of the command file. The DDA is configured to transmit 308, by the server system agent, a compressed file to the client system, wherein the compressed file includes the command file. In addition, the server system agent also transmits a checksum value (or hash value) generated using the command file's contents. The checksum value will later be used by the client system agent to verify the contents of the command file.

Furthermore, the DDA is configured to cause 310 the client system agent to extract the command file from the compressed file. For example, the client system agent may use the 'tar' utility to extract the command file from the compressed file, where the latter is transmitted as a tarball. Additionally, the client system agent performs a validation check on the received command file to determine that the file was not corrupted in transit. In one embodiment, the client system agent uses a checksum algorithm to generate a checksum value that is compared against the checksum value that is received from the server system agent in association with the command file.

The DDA is configured to cause 312 the client system agent to execute the command file on the one or more target locations. This execution activates one or more of a system update event on the client system and a software update event for the computer application. More specifically, the client system agent unpacks the received compressed file, and uses deployment instructions in the command file to stop the identified containers, apply the instructions from the received command file to applications in the identified containers, and restart the container. Additionally, during the execution at 310, the client system agent first makes copies of all application files of the targeted application and stores these as an application archive. During the archive process, the client system agent additionally generates a version control identifier and associates this with each application archive. In one embodiment, the application archive is stored at the client system. In another embodiment, the application archive is transmitted to the server system. In a still further embodiment, the application archive is transmitted to a separate archive computer system.

Figure 4:
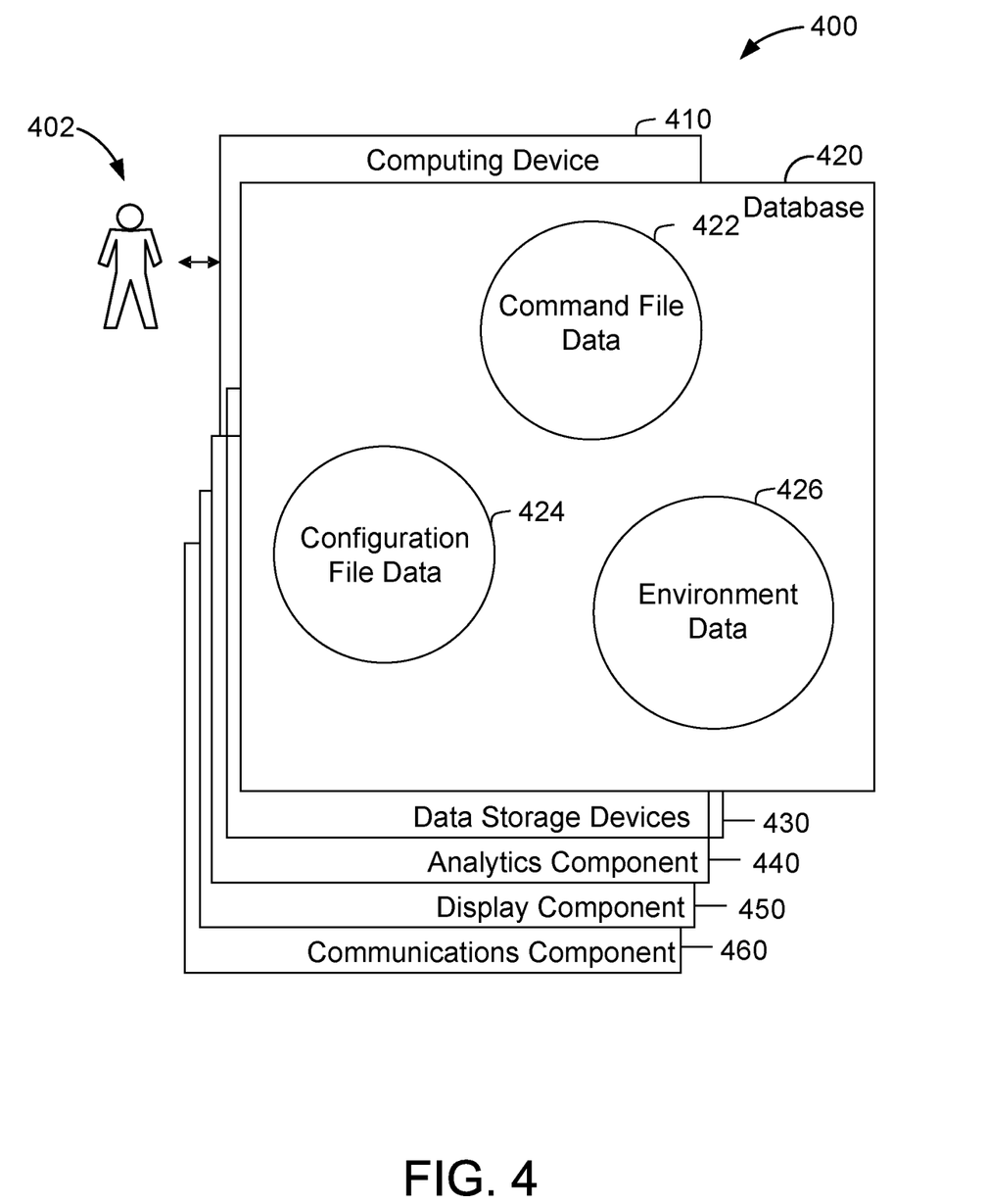
FIG. 4 shows an example configuration of a database within a computer device, along with other related hardware components, that may be used to manage automated application deployment.

FIG. 4 shows an example configuration of a database 400 within a computer device, along with other related hardware components, that may be used to manage automated application deployment. In some embodiments, computer device 410 is similar to server system 210 or client system 240 (shown in FIG. 2). User 402 (such as a user operating server system 210) may access computer device 410 in order to upload application update files (command files) and prepare these for transmission to client systems. In some embodiments, database 420 is similar to storage device 134 (shown in FIG. 1). In the example embodiment, database 420 includes command file data 422, configuration file data 424, and environment data 426. Command file data 422 includes computer-executable instructions that will cause a targeted application to be updated. For example, command file data 422 may include a bug fix, or a code change, or application upgrade, or change to a database table, or the like. Command file data 422 may also include instructions to uninstall an application, roll back an application, provide new data to an application for processing, or the like.

Configuration file data 424 includes configuration settings that are used in generating and applying the command file(s). For example, configuration file data 424 includes data regarding command file location (e.g., on a storage device at the server system). Configuration file data 424 includes other command file metadata such as file owner, file creation or modification dates/times, or the like. Configuration file data 424 also includes specific command file-related commands (e.g., prepare file, retrieve file, copy file, open file, delete file, transmit file, unpack (untar) file) or the like.

Environment data 426 includes data generated from an automatic environment discovery process that is periodically performed at the server system. As an example, the server system agent generates a series of database tables that associate each application instance, container, and client system. As another example, the server system agent stores the abovementioned data in a graph database, with application instances, containers, and client systems represented by nodes and edges created between those nodes to show relationships. Environment data 426 also includes log data received from client systems, which further includes data regarding success or failure of application updates, system shutdowns, application rollbacks, or the like.

Computer device 410 also includes data storage devices 430. Computer device 410 also includes analytics component 440. In a server system, analytics component 440 is preferably configured to prepare and transmit the command file using associated configuration files. In a client system, analytics component 440 is configured to extract command files from compressed files, determine file validation using a checksum algorithm, and execute the instructions included within the command file. Computer device 410 also includes display component 440 that can be used by user 402 to view command file deployments. Computer device 410 also includes communications component 460 which is used to communicate with remote computer devices such as client systems (shown in FIG. 1. In one embodiment, communications component 460 is similar to communications interface driver 115 (shown in FIG. 1).

As will be appreciated based on the foregoing specification, the above-described embodiments of the disclosure may be implemented using computer programming or engineering techniques including computer software, firmware, hardware or any combination or subset thereof, wherein the technical effect is to establish and operate a filesystem-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of automated deployment management for a computer network, the method implemented using a distributed deployment agent that includes a server system agent operating on a server system and a client system agent operating on a client system, the client system agent being communicatively coupled to the server system agent, the method comprising:

performing, by the server system agent, an environment discovery process to discover a plurality of connected devices including the client system and at least one target location present on the plurality of connected devices at a respective target location;

determining, by the server system agent based on the environment discovery process, one or more target locations of the at least one target location associated with the client system, the one or more target locations requiring at least one of a system update and a software update;

generating, by the server system agent, using a configuration file, a command file, wherein the command file includes computer-executable instructions configured to be executed on the client system, the client system hosting a computer application at the one or more target locations;

configuring, by the server system agent, the command file with deployment instructions for the client system to automate deployment of the command file;

transmitting, by the server system agent, a compressed file to the client system, wherein the compressed file includes the command file;

causing the client system agent to extract the command file from the compressed file; and causing the client system agent to execute the command file on the one or more target locations, wherein the execution activates one or more of a system update event on the client system and a software update event for the computer application.

2. A method in accordance with claim 1, wherein the compressed file includes one or more of a system command file and an update file, wherein the system command file includes a system start command and a system stop command, and wherein the update file is configured to cause an update to the computer application.

3. A method in accordance with claim 1, further comprising:

receiving, by the server system agent, a first log file, wherein the first log file indicates that a system error has occurred on the client system; and generating, using the configuration file, the compressed file, wherein the compressed file includes a rollback file configured to revert the client system to a system state that existed before the prior update event.

4. A method in accordance with claim 1, further comprising:
generating an archive file from at least one application file associated with the computer application, the archive file representing a last functional application state for the computer application prior to executing the command file on the one or more target locations;
generating a version control identifier associated with the archive file; and
preventing a deletion of the archive file during the software update event for the computer application.

5. A method in accordance with claim 4, further comprising:
receiving, by the server system agent, a second log file, wherein the second log file indicates that the computer application experienced an application error;
identifying the archive file using the version control identifier; and
restoring the computer application to the last functional application state.

6. A method in accordance with claim 1, wherein the client system is operated by an operating system (OS) kernel, wherein the OS kernel controls the operation of a virtualized container system hosted by the client system, and wherein the computer application runs within the virtualized container system, further comprising:
determining, based on a client system identifier, a virtualized container system identifier for the virtualized container system;
updating the command file with the virtualized container system identifier; and
executing the command file on the computer application.

7. A method in accordance with claim 1, further comprising:
processing, by the server system agent, the command file using a checksum algorithm to generate a first checksum value;
transmitting the first checksum value in association with the command file to the client system;
processing, by the client system agent, the command file using the checksum algorithm to generate a second checksum value; and
determining, by the client system agent, based on a discrepancy between the first checksum value and the second checksum value, that the command file became corrupted during transmission from the server system to the client system.

8. A system for automated deployment management for a computer network, the system comprising:
a distributed deployment agent (DDA), the distributed deployment agent comprising a server system agent operating on a server system and a client system agent operating on a client system, the client system agent being communicatively coupled to the server system agent, the DDA configured to:
performing, by the server system agent, an environment discovery process to discover a plurality of connected devices including the client system and at least one target location present on the plurality of connected devices at a respective target location;
determine based on the environment discovery process, by the server system agent, one or more target locations of the at least one target location associated with the client system, the one or more target locations requiring at least one of a system update and a software update;
generate, by the server system agent, using a configuration file, a command file, wherein the command file includes computer-executable instructions configured to be executed on the client system, the client system hosting a computer application at the one or more target locations;
configure, by the server system agent, the command file with deployment instructions for the client system to automate deployment of the command file;
transmit, by the server system agent, a compressed file to the client system, wherein the compressed file includes the command file;
cause the client system agent to extract the command file from the compressed file; and
cause the client system agent to execute the command file on the one or more target locations, wherein the execution activates one or more of a system update event on the client system and a software update event for the computer application.

9. A system in accordance with claim 8, wherein the DDA is further configured to:
receive, by the server system agent, a first log file, wherein the first log file indicates that a system error has occurred on the client system; and
generate, using the configuration file, the compressed file, wherein the compressed file includes a rollback file configured to revert the client system to a system state that existed before the prior update event.

10. A system in accordance with claim 8, wherein the DDA is further configured to:
generate an archive file from at least one application file associated with the computer application, the archive file representing a last functional application state for the computer application prior to executing the command file on the one or more target locations;
generate a version control identifier associated with the archive file; and
prevent a deletion of the archive file during the software update event for the computer application.

11. A system in accordance with claim 10, wherein the DDA is further configured to:
receive, by the server system agent, a second log file, wherein the second log file indicates that the computer application experienced an application error;
identify the archive file using the version control identifier; and
restore the computer application to the last functional application state.

12. A system in accordance with claim 8, wherein the client system is operated by an operating system (OS) kernel, wherein the OS kernel controls the operation of a virtualized container system hosted by the client system, and wherein the computer application runs within the virtualized container system, and wherein the DDA is further configured to:
determine, based on a client system identifier, a virtualized container system identifier for the virtualized container system;
update the command file with the virtualized container system identifier; and
execute the command file on the computer application.

13. A system in accordance with claim 8, wherein the DDA is further configured to:
process, by the server system agent, the command file using a checksum algorithm to generate a first checksum value;
transmit the first checksum value in association with the command file to the client system;

process, by the client system agent, the command file using the checksum algorithm to generate a second checksum value; and determine, by the client system agent, based on a discrepancy between the first checksum value and the second checksum value, that the command file became corrupted during transmission from the server system to the client system.

14. A non-transitory computer readable medium that includes computer executable instructions for automated deployment management for a computer network, wherein when executed by a distributed deployment agent comprising a server system agent operating on a server system and a client system agent operating on a client system, the client system agent being communicatively coupled to the server system agent, the computer executable instructions cause the DDA to:

perform, by the server system agent, an environment discovery process to discover a plurality of connected devices including the client system and at least one target location present on the plurality of connected devices at a respective target location;

determine, by the server system agent based on the environment discovery process, one or more target locations of the at least one target location associated with the client system, the one or more target locations requiring at least one of a system update and a software update;

generate, by the server system agent, using a configuration file, a command file, wherein the command file includes computer-executable instructions configured to be executed on the client system, the client system hosting a computer application at the one or more target locations;

configure, by the server system agent, the command file with deployment instructions for the client system to automate deployment of the command file;

transmit, by the server system agent, a compressed file to the client system, wherein the compressed file includes the command file;

cause the client system agent to extract the command file from the compressed file; and cause the client system agent to execute the command file on the one or more target locations, wherein the execution activates one or more of a system update event on the client system and a software update event for the computer application.

15. A non-transitory computer readable medium in accordance with claim 14, wherein the compressed file includes one or more of a system command file and an update file, wherein the system command file includes a system start command and a system stop command, and wherein the update file is configured to cause an update to the computer application.

16. A non-transitory computer readable medium in accordance with claim 14, wherein the computer-executable instructions further cause the DDA to:

receive, by the server system agent, a first log file, wherein the first log file indicates that a system error has occurred on the client system; and generate, using the configuration file, the compressed file, wherein the compressed file includes a rollback file configured to revert the client system to a system state that existed before the prior update event.

17. A non-transitory computer readable medium in accordance with claim 14, wherein the computer-executable instructions further cause the DDA to:

generate an archive file from at least one application file associated with the computer application, the archive file representing a last functional application state for the computer application prior to executing the command file on the one or more target locations;

generate a version control identifier associated with the archive file; and prevent a deletion of the archive file during the software update event for the computer application.

18. A non-transitory computer readable medium in accordance with claim 17, wherein the computer-executable instructions further cause the DDA to:

receive, by the server system agent, a second log file, wherein the second log file indicates that the computer application experienced an application error;

identify the archive file using the version control identifier; and restore the computer application to the last functional application state.

19. A non-transitory computer readable medium in accordance with claim 14, wherein the client system is operated by an operating system (OS) kernel, wherein the OS kernel controls the operation of a virtualized container system hosted by the client system, and wherein the computer application runs within the virtualized container system, and wherein the computer-executable instructions further cause the DDA to:

determine, based on a client system identifier, a virtualized container system identifier for the virtualized container system;

update the command file with the virtualized container system identifier; and execute the command file on the computer application.

20. A non-transitory computer readable medium in accordance with claim 14, wherein the computer-executable instructions further cause the DDA to:

process, by the server system agent, the command file using a checksum algorithm to generate a first checksum value;

transmit the first checksum value in association with the command file to the client system;

process, by the client system agent, the command file using the checksum algorithm to generate a second checksum value; and determine, by the client system agent, based on a discrepancy between the first checksum value and the second checksum value, that the command file became corrupted during transmission from the server system to the client system.

* * * * *